United States Patent

Baron et al.

Patent Number: 5,730,409
Date of Patent: Mar. 24, 1998

[54] AUDIO SPEAKER WITH INTEGRAL BRACKET

[75] Inventors: Allen S. Baron, Baltimore; Robert M. Cordones, Elderburg; Bradley M. Starobin, Baltimore; Paul D. Brown, Lutherville; Daniel M. Zacharko, Millers, all of Md.; Ronald R. Hess, Fort Walton Beach, Fla.

[73] Assignee: Britannia Investment Corporation, San Diego, Calif.

[21] Appl. No.: 583,586

[22] Filed: Jan. 5, 1996

[51] Int. Cl.⁶ .................................................. E04G 3/00
[52] U.S. Cl. ........................ 248/292.12; 248/288.11; 248/292.13
[58] Field of Search ................... 248/292.12, 291.1, 248/292.13, 288.11, 548, 549, 274.1, 289.11, 183.2, 131, 276.1, 324, 316.1

[56] References Cited

U.S. PATENT DOCUMENTS

| | | | |
|---|---|---|---|
| 3,604,923 | 9/1971 | Moffatt | 248/324 |
| 3,911,221 | 10/1975 | Wong | 179/1 |
| 5,062,608 | 11/1991 | Phelps et al. | 248/289.11 |
| 5,201,896 | 4/1993 | Kruszewski | 248/278 |
| 5,226,622 | 7/1993 | LeAnna | 248/183.2 |
| 5,251,859 | 10/1993 | Cyrell et al. | 248/288.3 |
| 5,368,270 | 11/1994 | Wiwczar | 248/610 |

Primary Examiner—Ramon O. Ramirez
Assistant Examiner—Anita M. King
Attorney, Agent, or Firm—Snell & Wilmer

[57] ABSTRACT

A bracket integral to an audio speaker provides simple mounting of the speaker on a wall at various angles by rotation of the bracket and the speaker with respect to each other. A biasing element and serrated sections on the bracket and the speaker allow the speaker to be rotated to different angles and lock the speaker in place, preventing it from moving over time. The bracket also serves as a flexible stand for the audio speaker when the speaker is placed on a horizontal surface. The concentric design at the point of rotation of the bracket causes the speaker to be directed upward, downward, to the right, or to the left. Keyhole slots in the bracket allow for simple hanging on a wall.

13 Claims, 4 Drawing Sheets

AUDIO SPEAKER WITH INTEGRAL BRACKET

BACKGROUND OF THE INVENTION

The present invention relates generally to audio speakers, and more particularly, to an audio speaker having an integral bracket for mounting the speaker on horizontal and vertical surfaces, such as walls, ceilings, shelves, or floors.

The demand for high quality sound systems has increased dramatically in recent years. For example, home theaters utilizing surround sound are becoming more and more popular. To simulate the audio effects of a theater, speakers are placed in various locations in a room, e.g. in front of, on the side of, and behind the listener. In attempts to achieve a desired quality of sound, the demand to mount speakers on walls and ceilings and direct the sound by mounting the speakers at various angles has increased.

Speakers are generally bulky and do not readily lend themselves to mounting on a wall or ceiling. While some mounting fixtures have been designed to permit mounting a speaker on a wall, typically these devices are difficult to work with, require screwing or drilling directly into the speaker body, and often do not allow the sound to be directed. Typically, where it is possible to direct the sound, to change the orientation of the speaker once it is mounted requires adjustment to screws, wing-nuts or even complete dismounting and re-mounting of the speaker. In addition, known devices have generally not been aesthetically pleasing.

An increasingly popular choice with home owners is to mount speakers in a wall. While mounting the speaker in the wall reduces the aesthetic concerns because the bracket is not visible, mounting speakers in a wall is not without drawbacks. For example, mounting speakers in the walls of an existing home often proves difficult and quite costly. Even when the home or building is designed to have speakers mounted in the wall, because speakers are typically bulky they often require custom-made brackets. In addition, mounting a speaker in the wall does not permit the sound to be directed; the speaker is typically mounted flush with the wall, causing the sound to be directed essentially perpendicular to the wall.

SUMMARY OF THE INVENTION

Accordingly, the present invention provides an audio speaker with an integral bracket that overcomes the limitations and deficiencies of presently known devices. In accordance with a preferred exemplary embodiment, the apparatus of the present invention comprises a body having a serrated mounting extension, a bracket having a serrated bracket extension, and a mechanism for placing the serrated mounting extension and the serrated bracket extension in secured, rotatable communication with each other. In accordance with various aspects of the present invention, the bracket includes a keyhole slot which allows for simple mounting of the speaker on a wall and rotation of the speaker to various angles. In accordance with another aspect of the invention, the bracket operates as a flexible stand when the speaker is mounted on a horizontal surface, such as a shelf.

BRIEF DESCRIPTION OF THE DRAWING FIGURES

A preferred exemplary embodiment of the present invention will hereinafter be described in conjunction with the appended drawing figures, in which like numerals denote like elements, and:

DETAILED DESCRIPTION OF PREFERRED EXEMPLARY EMBODIMENTS

Figure 1:
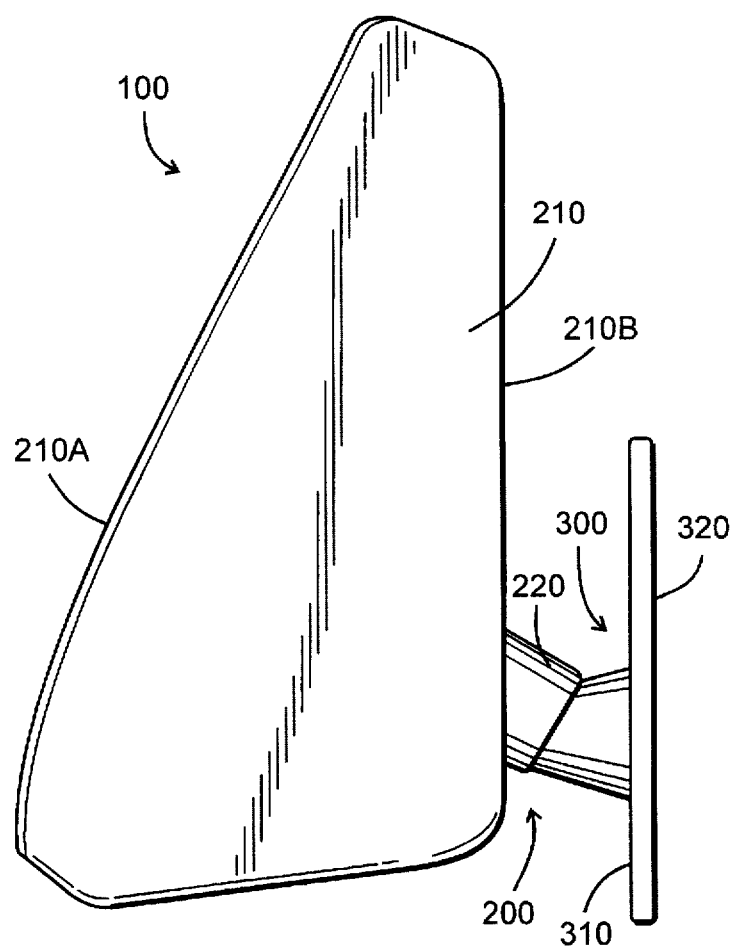
FIG. 1 is a side view of an exemplary audio speaker with integral bracket in accordance with the present invention.
Figure 2:
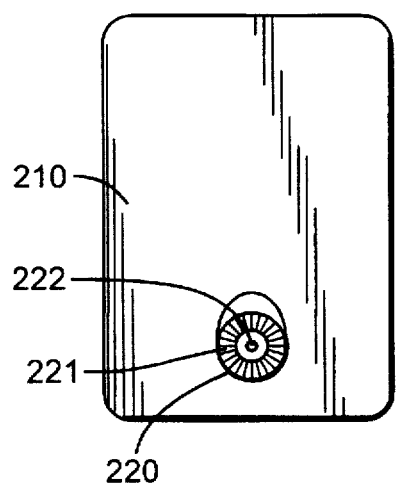
FIG. 2 is a rear view of an exemplary audio speaker with integral bracket in accordance with the present invention.
Figure 3:
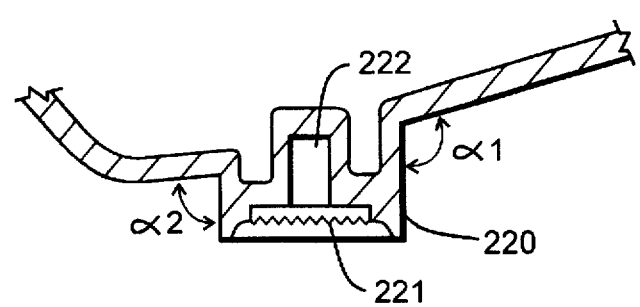
FIG. 3 is a partial cutaway view of a mounting extension in accordance with the present invention.

Referring to FIG. 1, a preferred exemplary audio speaker with integral bracket 100 suitably comprises a speaker 200 and a bracket 300; wherein bracket 300 has a top side 310 and a bottom side 320. Referring now to FIGS. 1 through 4, speaker 200 suitably comprises body 210 having a front surface 210A and a back surface 210B and mounting extension 220. Wherein, mounting extension 220 is disposed on back surface 210B of body 210. Body 210 suitably serves as the housing for the audio components such as a tweeter and/or woofer. Mounting extension 220 suitably provides the connection between speaker 200 and bracket 300. In accordance with a preferred embodiment of the present invention, mounting extension 220 suitably comprises a plurality of serrations 221, aperture 222, and threaded insert 230. Threaded insert 230 is securely disposed within aperture 222. In accordance with various aspects of the present invention, mounting extension 220 suitably extends from back surface 210B of body 210 at angles $\alpha 1$ and $\alpha 2$. In accordance with a preferred embodiment, the surface of serrations 221 are angled with respect to the plane of back surface 210B of body 210. Alternatively, the surface of serrations 221 may run substantially parallel to the plane of back surface 210B of body 210.

Figure 6:
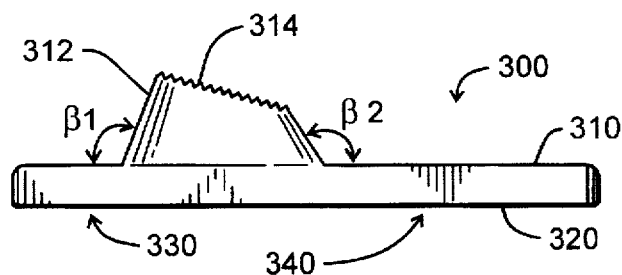
FIG. 6 is a side view of the integral bracket of FIG. 5.

Referring now to FIG. 1 and FIGS. 5 through 8, bracket 300 comprises a bracket extension 312 disposed on top side 310 having a plurality of serrations 314 formed thereon and an aperture 316 formed therein. In accordance with another aspect of the present invention, bracket 300 further comprises a first leg 330 and a second leg 340. Bracket extension 312 is preferably disposed off-centered, causing second leg 340 to be longer than first leg 330. As best illustrated in FIG. 6, bracket extension 312 rises above top side 310 at angles $\beta 1$ and $\beta 2$ such that the surface of serrations 314 is angled with respect to top side 310. Bracket 300 further comprises apertures 322 and 324 formed in bottom side 320. Suitably, apertures 324 form hanging apertures and in accordance with a preferred embodiment of the present invention, apertures 324 are formed as keyhole slots. Aperture 322 suitably provides access to aperture 316.

Figure 4:
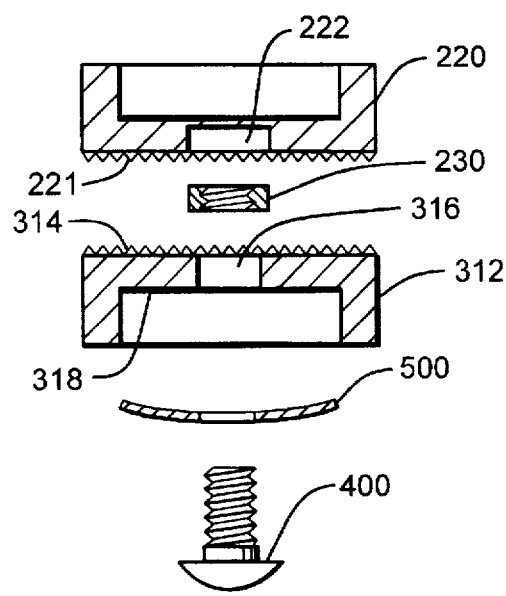
FIG. 4 is a cutaway exploded view of the elements forming the connection between the speaker and bracket of the present invention.
Figure 5:
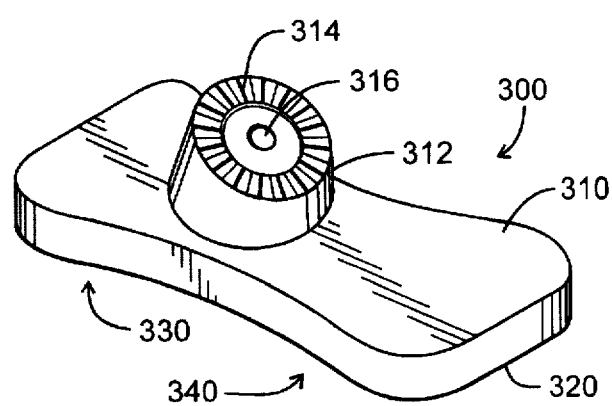
FIG. 5 is a top view of the integral bracket in accordance with the present invention.
Figure 9:
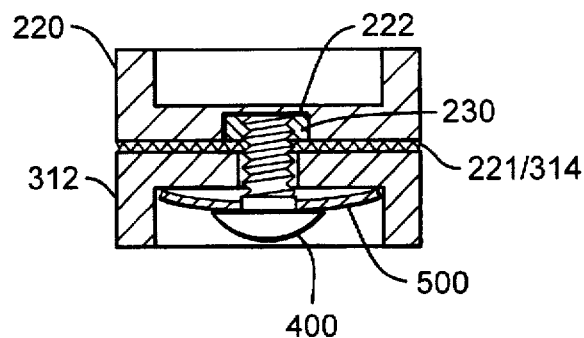
FIG. 9 is a cutaway view of the elements forming the connection between the speaker and bracket of the present invention.

Referring to FIGS. 4 and 9, audio speaker with integral bracket 100 further comprises securing mechanism 400 and spring element 500. In accordance with a preferred embodiment of the present invention, securing mechanism 400 is a screw which connects speaker 200 to bracket 300. Screw 400 is suitably inserted into aperture 322, through aperture 316, and screwed into threaded insert 230 which is contained within aperture 222, thereby securing speaker 200 and bracket 300 to each other.

Figure 7:
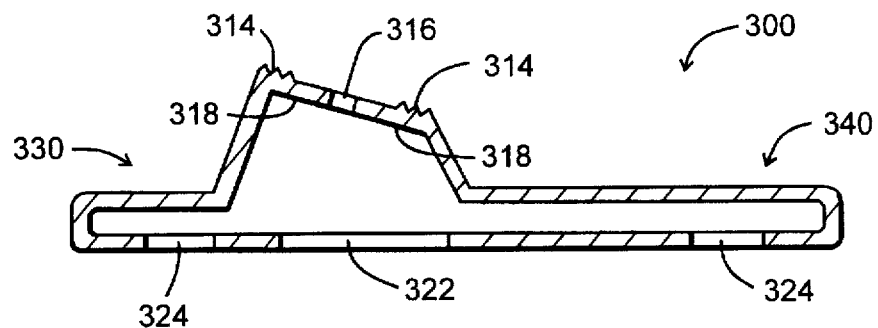
FIG. 7 is a cutaway side view of the integral bracket of FIGS. 5 and 6.
Figure 8:
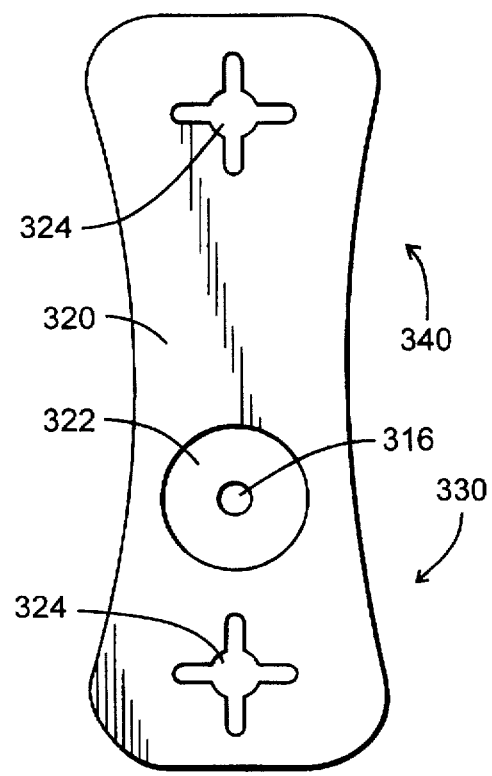
FIG. 8 is a bottom view of the integral bracket in accordance with the present invention.

Spring element 500 is suitably disposed between the head of screw 400 and surface 318 (FIG. 7). Spring element 500 suitably exerts pressure against screw 400 causing the connection between speaker 200 and bracket 300 to remain secure while permitting rotation of speaker 200 and bracket 300 with respect to each other. More particularly, spring element 500 allows rotation of speaker 200 and bracket 300 without rotation, loosening, or tightening of screw 400; screw 400 remains secured within threaded insert 230. Screw 400 is tightened sufficiently to hold speaker 200 and bracket 300 together and place serrations 221 and serrations 314 in interlocking contact with each other.

In accordance with a preferred embodiment of the present invention, serrations 314 and serrations 221 are each formed of forty-four (44) individual serrations. Referring to FIGS. 4 and 9, while serrations 221 and 314 form an interlocking connection which suitably prevent undesired movement of speaker 200, spring element 500 is selected to have a biasing force that can manually be overcome to permit an individual to rotate speaker 200. The proper biasing force will, of course, be dependent upon the weight of speaker 200 in a particular instance. Rotation of speaker 200 and bracket 300 with respect to each other causes rotation or relative translation over serrations 221 and 314; after rotating speaker 200 to a desired point and releasing the rotational force, by virtue of the biasing force of spring element 500, serrations 221 and 314 interlock and hold speaker 200 in place. Spring element 500 may suitably comprise any mechanism capable of providing the biasing force and function as described, such as for example, a leaf spring, a helical spring, or a bellville spring. In accordance with a preferred embodiment of the present invention, spring element 500 comprises a piece of slightly curved spring steel, e.g. a leaf spring.

Figure 10:
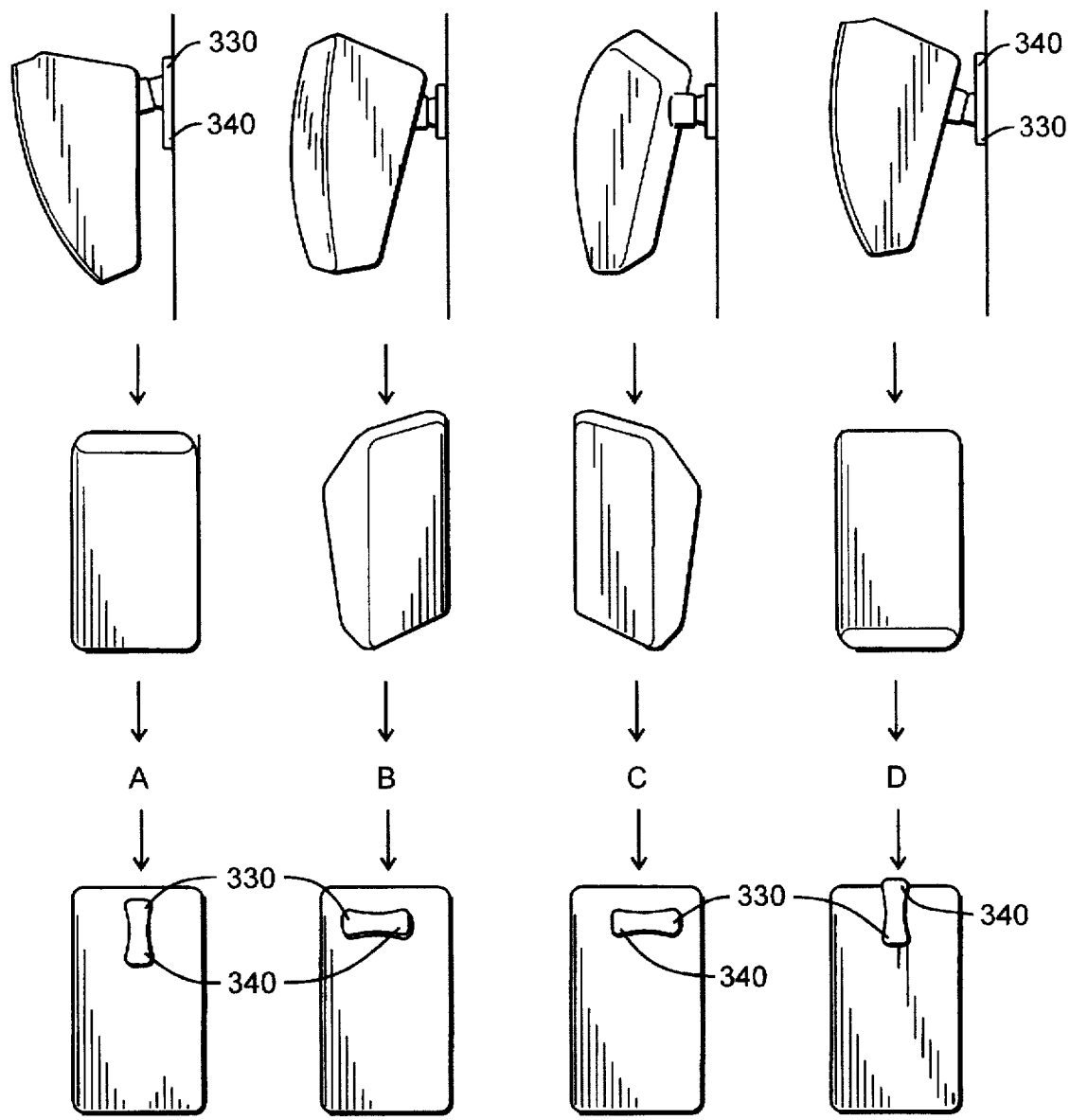
FIGS. 10A through 10D are views of an audio speaker with integral bracket mounted at various angles in accordance with the present invention.

In accordance with various aspects of the present invention, speaker 200 may be mounted at various angles on a wall via bracket 300. As discussed above, the surfaces of serrations 221 and serrations 314 are angled with respect to the back of body 220 and top side 310, respectively. Because of the angled surfaces, mating mounting extension 220 and bracket extension 312 at serrations 221 and 314 through use of screw 400 and spring element 500 forms a defined angle with respect to the plane of back surface of 210B of body 210. The angle defined by top side 310 and the surface of serrations 314 causes speaker 200 to be directed upward, downward, to the right, or to the left. Referring to FIGS. 10A through 10D, the direction of speaker 200 may, thus, be controlled by the direction in which bracket 300 is mounted. For example, when bracket 300 is secured to a wall via keyhole slots 324 with leg 340 (the longer leg) being above leg 330 (the shorter leg), speaker 200 is directed slightly upward (FIG. 10D). Conversely, when bracket 300 is secured to a wall via keyhole slots 324 with leg 330 (the shorter leg) above leg 340 (the longer leg), speaker 200 is directed slightly downward (FIG. 10A).

Further control of the direction of speaker 200 may be attained by rotating speaker 200 with respect to bracket 300, for example, after bracket 300 is secured to a wall. As speaker 200 is rotated with respect to bracket 300, the defined angle created by the angled serrated surfaces 221, 314 changes, thereby changing the orientation of speaker 200.

In accordance with the present invention, speaker 200 and bracket 300 may be manually rotated with respect to each other without the use of tools or need to dismount audio speaker with integral bracket 100 from its current mounting. As discussed above, spring element 500 holds speaker 200 securely to bracket 300 while still allowing rotation of each with respect to the other. Serrations 221 and 314, urged together by the biasing force of spring element 500, act together to form a positive lock, preventing the speaker from moving or creeping over time.

Figure 11:
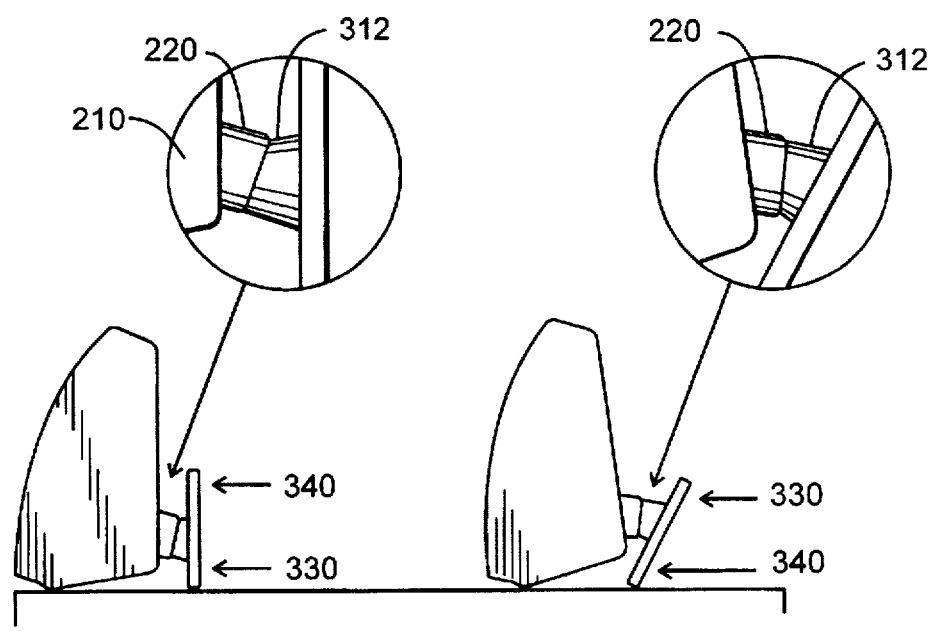
FIG. 11 is a side view of an audio speaker with integral bracket mounted on a shelf in accordance with the present invention.

Similarly, audio speaker with integral bracket 100 may be mounted on a horizontal surface, such as a shelf. When audio speaker with integral bracket 100 is mounted on a horizontal surface, bracket 300 suitably serves as a flexible stand for speaker 200. For example, referring to FIG. 11, rotation of bracket 300 so that either leg 330 or leg 340 is in contact with the vertical surface causes speaker 200 to be directed slightly upward or downward, respectively.

Thus, by providing an audio speaker with an integral bracket wherein the bracket allows mounting of the speaker on horizontal and vertical surfaces at desired angles and directions and permits manual rotation of the speaker with respect to the bracket, the apparatus of the present invention suitably overcomes shortcomings of known devices.

The foregoing description of a preferred exemplary embodiment and best mode of the invention known to the applicant at the time of filing the application has been presented for the purposes of illustration and description. It is not intended to be exhaustive or to limit the invention to the precise form disclosed; many modifications and variations are possible within the scope of the invention as set forth in the present description. For example, while the apparatus of the present invention is described in the context of an audio speaker, the principles of the invention may be utilized with other components, such as televisions, wall hangings, or light fixtures. The various embodiments described herein were chosen to conveniently explain the principles of the invention and its practical application, to thereby enable others of ordinary skill in the art to best utilize the invention in various embodiments and with various modifications as are suited to the particular use contemplated. It is intended that the spirit and scope of the invention be defined by the appended claims.

We claim:

1. An apparatus comprising:

a body having a serrated mounting extension;

a bracket having a serrated bracket extension; and a mechanism for placing the serrated mounting extension and the serrated bracket extension in secured, rotatable communication with each other, said mechanism comprising:

a fastener for coupling the serrated mounting extension and the serrated bracket extension, and thereby the body and the bracket, in secured rotatable communication; and a biasing means for urging the serrated mounting extension and the serrated bracket extension, and thereby the body and bracket, into contact, and having a biasing force allowing the body and the bracket to rotate with respect to each other upon application of an additional force while keeping the bracket and body fixed with respect to each other in the absence of any additional force.

2. An apparatus comprising:

a body having a front surface and a back surface;

a mounting extension disposed on the back surface of the body and having a serrated top surface;

a bracket having a top side and a bottom side;

a bracket extension disposed on the top side of the bracket and having a serrated top surface; and a means for coupling the bracket to the body in secured, rotatable communication:

wherein the serrated top surface of the bracket extension is angled with respect to the top side of the bracket, wherein the angle defined by the serrated top surface of the bracket extension and the top side of the bracket cause the body to be directed upward, downward, to the right, or to the left upon rotation of the bracket with respect to the body.

3. The apparatus of claim 2 wherein the serrated top surface of the mounting extension is angled with respect to the back surface of the body.

4. The apparatus of claim 2 wherein the bracket further comprises:

at least one aperture formed in the bottom side of the bracket, wherein the aperture may be utilized to hang the bracket on a wall.

5. The apparatus of claim 4 wherein the aperture is formed as a keyhole slot.

6. The apparatus of claim 2 wherein the means for coupling the bracket to the body in secured, rotatable communication comprises:

a fastener for coupling the serrated surface of the mounting extension and the serrated surface of the bracket extension, and thereby the body and the bracket, in secured rotatable communication; and a biasing means for urging the serrated surface of the mounting extension and the serrated surface of the bracket extension, and thereby the body and bracket, into contact, and having a biasing force allowing the body and the bracket to rotate with respect to each other upon application of an additional force while keeping the bracket and body fixed with respect to each other in the absence of any additional force.

7. An audio speaker comprising:

a body including a mounting extension;

a bracket;

a fastener for coupling the body mounting extension and the bracket in secured rotatable communication; and a biasing means for urging the body mounting extension and bracket into contact, and having a biasing force allowing the body and the bracket to rotate with respect to each other upon application of an additional force while keeping the bracket and body fixed with respect to each other in the absence of any additional force, said biasing means comprising a leaf spring.

8. The audio speaker with integral bracket of claim 7, wherein the fastener for coupling the body and the bracket in secured rotatable communication comprises a screw.

9. The audio speaker with integral bracket of claim 7, wherein the bracket comprises:

a top side;

a bottom side; and a bracket extension disposed on and rising up from the top side.

10. The apparatus of claim 7, wherein:

said mounting extension has a serrated surface;

said bracket comprises a top side and a bracket extension having a serrated top surface configured to cooperate with the serrated surface of the mounting extension;

the serrated top surface of the bracket extension is angled with respect to the top side of the bracket; and the angle defined by the serrated top surface of the bracket extension and the top side of the bracket cause the body to be directed upward, downward, to the right, or to the left upon rotation of the bracket with respect to the body.

11. An apparatus comprising:

a body having a serrated mounting extension;

a bracket comprising a top side and a bracket extension having a serrated top surface; and a mechanism for placing the serrated mounting extension and the serrated bracket extension in secured, rotatable communication with each other; wherein:

the serrated top surface of the bracket extension is angled with respect to the top side of the bracket; and the angle defined by the serrated top surface of the bracket extension and the top side of the bracket cause the body to be directed upward, downward, to the right, or to the left upon rotation of the bracket with respect to the body.

12. The apparatus of claim 11, wherein said mechanism comprises:

a fastener for coupling the serrated mounting extension and the serrated bracket extension, and thereby the body and the bracket, in secured rotatable communication; and a biasing means for urging the serrated mounting extension and the serrated bracket extension, and thereby the body and bracket, into contact, and having a biasing force allowing the body and the bracket to rotate with respect to each other upon application of an additional force while keeping the bracket and body fixed with respect to each other in the absence of any additional force.

13. The apparatus of claim 12, wherein the biasing means for urging the body and bracket into contact comprises a leaf spring.

* * * * *